No. 824,937. PATENTED JULY 3, 1906.
P. B. KIMPLER.
RAILWAY TRACK SCALE.
APPLICATION FILED APR. 4, 1906.

2 SHEETS—SHEET 1.

WITNESSES:

Peter B. Kimpler,
INVENTOR.

By C. A. Snow & Co.
ATTORNEYS

No. 824,937. PATENTED JULY 3, 1906.
P. B. KIMPLER.
RAILWAY TRACK SCALE.
APPLICATION FILED APR. 4, 1906.

2 SHEETS—SHEET 2.

WITNESSES:

Peter B. Kimpler,
INVENTOR.
By C. A. Snow & Co.
ATTORNEYS

THE NORRIS PETERS CO., WASHINGTON, D.C.

UNITED STATES PATENT OFFICE.

PETER B. KIMPLER, OF ELLINWOOD, KANSAS.

RAILWAY-TRACK SCALE.

No. 824,937.  Specification of Letters Patent.  Patented July 3, 1906.

Application filed April 4, 1906. Serial No. 309,918.

*To all whom it may concern:*

Be it known that I, PETER B. KIMPLER, a citizen of the United States, residing at Ellinwood, in the county of Barton and State of Kansas, have invented a new and useful Railway-Track Scale, of which the following is a specification.

This invention relates to railway-track scales, and has for its object to provide novel mechanism for raising and lowering the scale-platform so as to normally maintain the weighing track-section in alinement with the fixed rail-sections with the platform out of connection with the weighing mechanism, thereby to relieve the weighing mechanism of strains incident to the passage of trains along the track. The raising and lowering mechanism is so arranged as to enable the convenient manual control thereof for raising and lowering the platform with a loaded car thereon.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
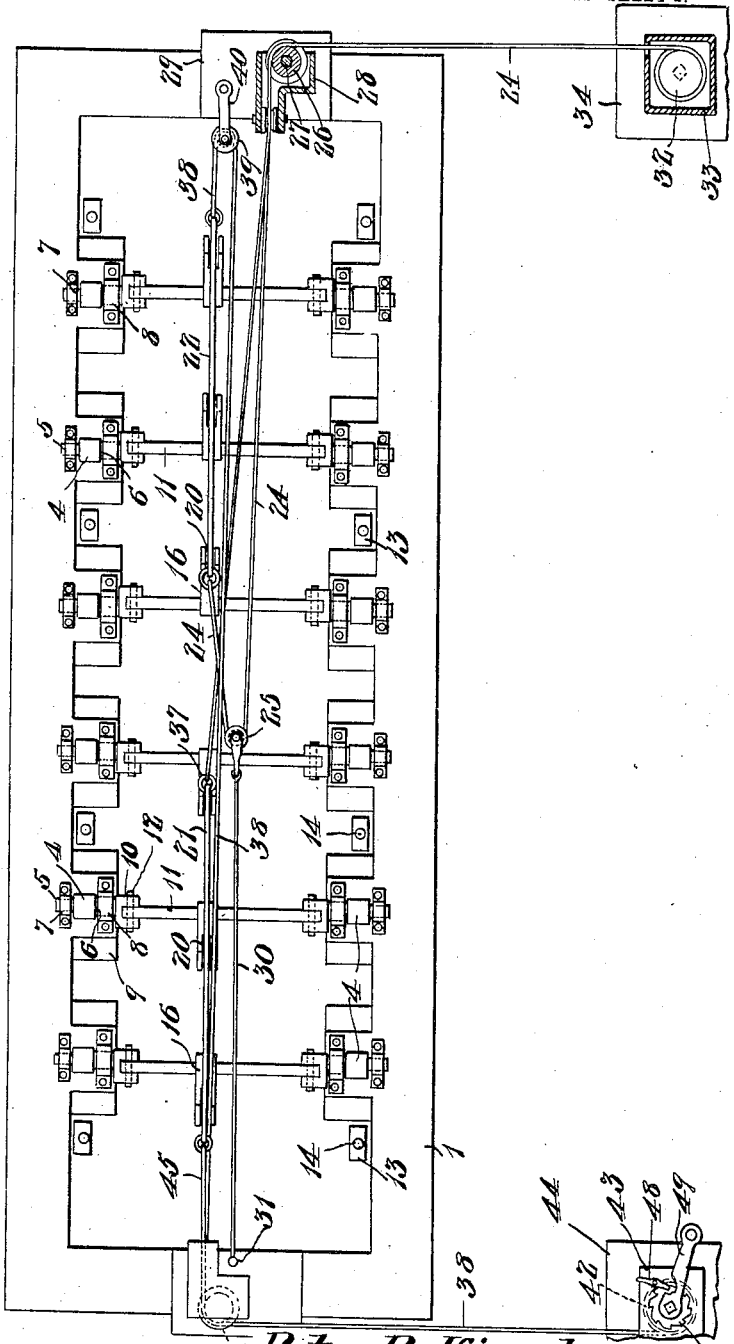
Figure 2:
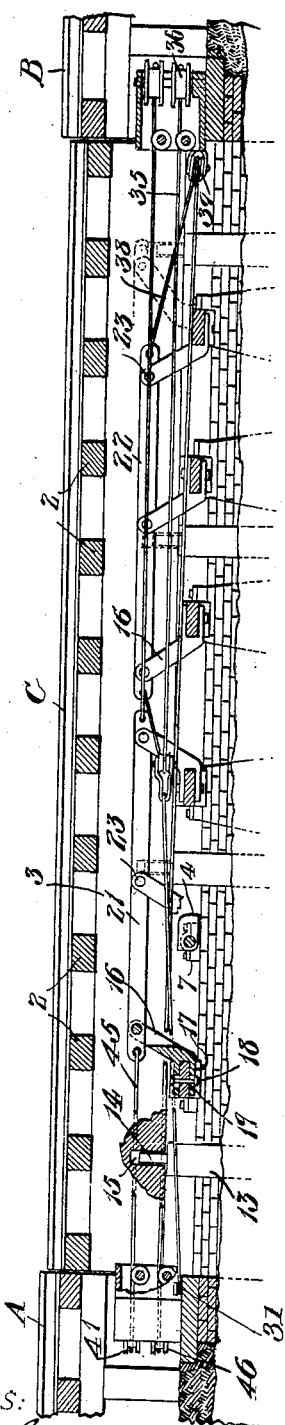
Figure 3:
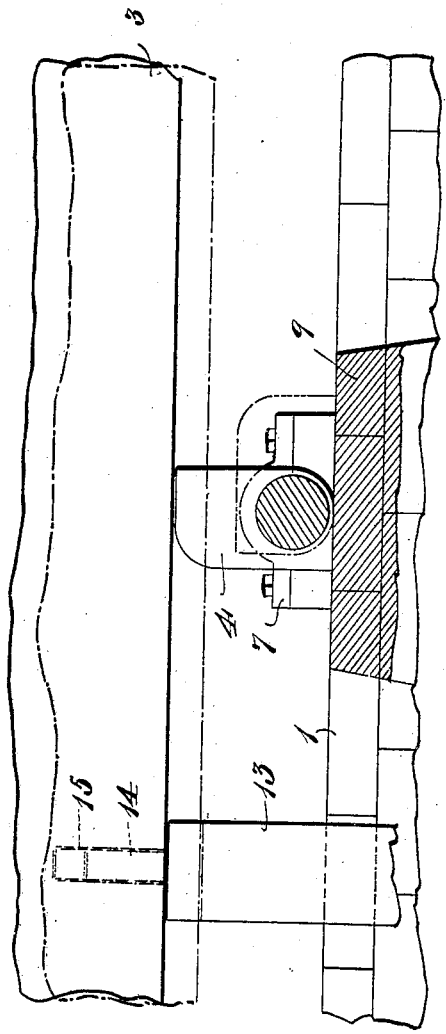

In the drawings, Figure 1 is a top plan view of a railway-track scale embodying the features of the present invention, the platform being removed to show the raising and lowering mechanism. Fig. 2 is a longitudinal sectional view with the platform in place. Fig. 3 is an enlarged fragmentary sectional view illustrating one of the lifting-cams and the manner in which it operates to lift the platform.

Like characters of reference designate corresponding parts in all of the figures of the drawings.

As best shown in Fig. 2 of the drawings, wherein A designates a portion of one stationary track-section and B another portion of the stationary track-section, it will be seen that a pit is dug between these sections and suitably walled, as shown at 1, the pit being for the accommodation of the weighing mechanism, (not shown,) which may be of any approved type. The space between the stationary track-sections A and B is bridged by a vertically-movable track-section C, supported upon cross-ties 2, which are in turn carried by the platform, which is made up of two longitudinal sills, one of which has been shown at 3.

For the support of each sill there is a series of cams 4, each of which is provided with opposite trunnions 5 and 6, mounted to rotate in bearings 7 and 8, provided upon the top of an abutment 9, located within the pit at the inner side of the adjacent wall thereof. The inner journal 6 projects inwardly across the pit for a suitable distance and is provided in its extremity with a longitudinal seat 10 for the reception of a cross-bar 11, which is held in place by means of a fastening 12, piercing the socketed end of the journal and the adjacent end of the cross-bar. It will here be explained that the cams are disposed in pairs, one at each side of the pit, and each cross-bar connects the members of one pair of cams so as to impart simultaneous movements thereto. It will of course be understood that each sill 3 of the platform rests upon the series of cams at the adjacent side of the pit, and when the cam is swung up into its upright position, as shown by full lines in Fig. 3, the sills will be elevated and the track-sections C will be brought into registration with the track-sections A and B for the passage of trains across the scales.

Connection between the platform and scales is had by means of a series of upright push-rods 13, which rise from the pit and are provided at their upper ends with upstanding pins 14, loosely received within sockets 15 in the under sides of the sills, with the latter resting upon the tops of the bars. When the sills are elevated by the cams, the weight of the platform and the additional weight of a car are supported by the cams 4, and thus the weighing mechanism is relieved of strain, particularly when trains are passing along the track. When the platform is lowered, the sills are then supported by the push-rods 13, which are in turn connected to the weighing mechanism, which renders the scale operative.

For the purpose of simultaneously actuating all of the cams there is provided mechanism as follows: Each cross-bar 11 is provided with an upstanding arm 16, the lower end of which is preferably provided with a substantially horizontal fork 17, straddling the adjacent cross-bar and connected thereto by a fastening 18, the sides of the fork being provided with corresponding slots 19 for the accommodation of the fastening and to permit endwise adjustment of the fork upon the cross-bar. By preference each lever inclines upwardly and toward the middle of the apparatus and is provided in its upper end with a bifurcation 20. A connecting-bar 21 is received within the bifurcated tops of one set of levers, and another connecting-bar 22 is received within the bifurcations of the tops of the other set of levers, each bar being pivotally connected to the respective levers by suitable pivotal connections 23.

To the inner end of the connecting-rod 23 there is attached a cable 24, which extends toward the other end of the device and passes around a guide 25 and thence back to the right-hand end of the apparatus and around a guide-pulley 26, mounted upon an upright axis 27, journaled in a suitable case or boxing 28, which is in turn mounted upon a bed-plate 29. The guide 25 is preferably a pulley and is connected to a cable 30, which is anchored at the other end of the pit, as at 31. After leaving the guide 26 the cable 24 extends transversely away from the track and is wound upon a drum or windlass 32, journaled in a suitable case 33, which is mounted upon a suitable foundation 34. Another cable 35 extends from the drum or windlass 32 around a guide-pulley 36, carried by the axis 27 of the pulley 26, and thence inwardly and connected to the inner end of the connecting-rod 21, as at 37.

To the inner end of the connecting-bar 22 there is connected a cable 38, which passes around a guide-pulley 39, which is suitably supported—say by means of a bracket 40, connected to the bed-plate or foundation 29. From the pulley 39 the cable 38 extends to the other end of the pit and passes around a suitable guide-pulley 41, after which it passes transversely away from the track and is wound upon a drum or windlass 42 (indicated by dotted lines) in the case or boxing 43, erected upon the foundation 44. Another cable 45 extends from the outer end of the bar 21 and passes around a guide-pulley 46, carried by the axis of the pulley 41, and thence around a drum 42. Each of the drums 32 and 42 is provided at its upper end with a ratchet-disk 47, with which coöperates a dog 48, pivotally mounted upon the top of the adjacent case or boxing. The movable crank-handle 49 is provided for application to either of the drums or windlasses for the manual manipulation thereof.

Normally the platform and movable track-section are supported in an elevated position, so as to relieve their weights from the weighing mechanism. When a loaded car has been run upon the track-section C for weighing the same, the track-section is lowered until it is brought into connection with the weighing mechanism through the medium of the push-rods 12. To lower the platform and the track-section C, the windlass 42 is operated to wind the cables 38 and 45 thereon, whereby the two sets of arms 16 will be swung away from one another, so as to swing the cams from their upright positions to their horizontal positions, as will be understood by reference to Fig. 3, whereby the sills will be lowered in engagement with the push-rods 13 and the scale will be in an operative condition. After the car has been weighed the windlass 32 is operated so as to wind the cables 24 and 35 thereon, whereupon the two sets of arms 16 will be swung toward one center of the device, thereby elevating the cams 4, which in turn elevate the platform and bring the movable track-section C into registration with the stationary track-sections A and B.

Having thus described the invention, what is claimed is—

1. In a platform-scale, the combination of a platform, sets of cams arranged to raise and lower the platform, push-rods arranged in coöperative relation to the platform to sustain the weight of the latter when the cams are moved to their inoperative position, a member connecting the cams of each set, and a mechanism for actuating the cams which comprises a cable attached to each member, guides for the cables, and a windlass connected with the cables which is adapted to simultaneously move the members in opposite directions.

2. In a platform-scale, the combination of two substantially parallel sets of cams, each cam having a pair of trunnions, bearings for the trunnions, the inner trunnion being projected and provided with a terminal socket, cross-bars received within the sockets of the opposite trunnions, detachable fastenings connecting the trunnions and the cross-bars, a platform supported upon the cams, arms carried by the cross-bars, and means connected to the arms for rotating the cross-bars.

3. In a platform-scale, the combination of two series of rotatable cams, cross-bars connecting the corresponding cams of the two series, arms carried by the cross-bars, a connecting-rod connecting one half of the arms, another connecting-rod connecting the other half of the arms, a windlass at each end of the device, a cable extending from one windlass to the inner end of the opposite connecting-rod, another cable leading from the same windlass to the inner end of the adjacent connecting-rod, a guide for said other cable located beyond the inner end of the adjacent connecting-rod, a cable leading from the other windlass to the outer end of the adjacent connecting-rod, another cable leading from the latter windlass to the outer end of the opposite connecting-rod, and a guide for said cable beyond the outer end of the other connecting-rod.

4. In a platform-scale, the combination of abutments, cams rotatably mounted upon the abutments, cross-bars connecting opposite cams, upright push-bars, a platform supported upon the cams normally out of engagement with the push-bars and capable of being lowered with the cams into engagement with the push-bars, arms rising from the cross-bars and terminating short of the platform, a connection-rod connecting one half of the arms, another connecting-bar connecting the other half of the arms, a windlass at each end of the scale, a cable leading from one windlass to the inner end of the opposite connecting-bar, another cable leading from the same windlass to the inner end of the adjacent connecting-bar, a guide for said cable located beyond the inner end of the adjacent connecting-bar, a cable leading from the other windlass to the outer end of the other connecting-bar, another cable leading from said other windlass to the outer end of the opposite connecting-bar, and a guide for said cable located beyond the outer end of said opposite connecting-bar.

In testimony that I claim the foregoing as my own I have hereto affixed my signature in the presence of two witnesses.

PETER B. KIMPLER.

Witnesses:
W. LEO BOCKEMÖHLE.
J. M. KIMPLER.